J. E. CRAVER.
WHEEL LOCK.
APPLICATION FILED MAY 28, 1914.
1,114,585.
Patented Oct. 20, 1914.
2 SHEETS—SHEET 1.
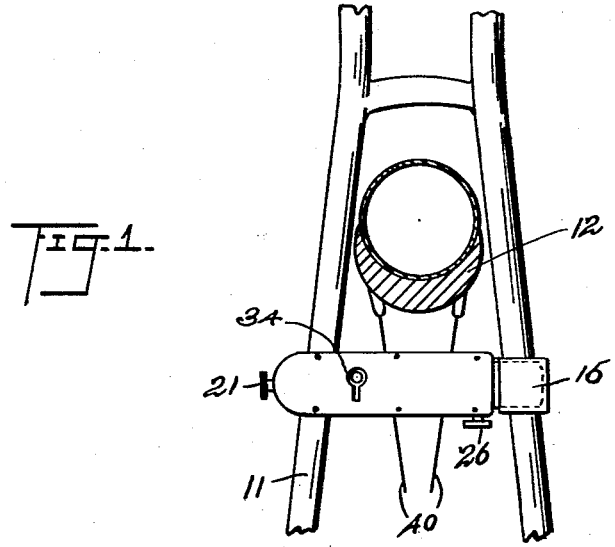
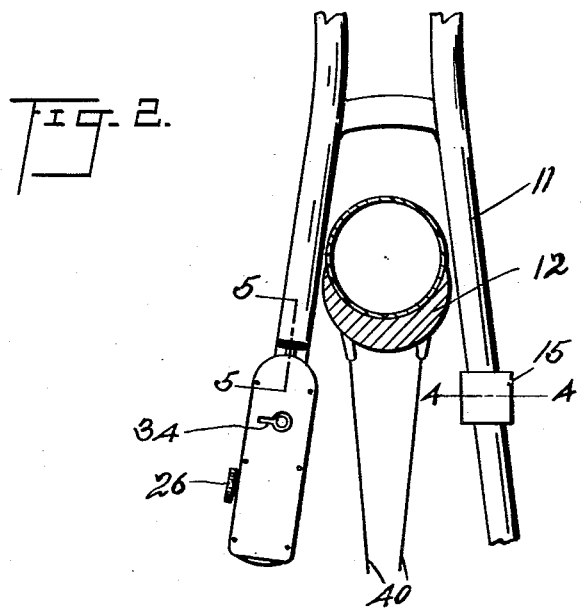
Witnesses
Inventor
J. E. Craver.
By
Attorney J. E. CRAVER.
WHEEL LOCK.
APPLICATION FILED MAY 28, 1914.
1,114,585.
Patented Oct. 20, 1914.
2 SHEETS—SHEET 2.
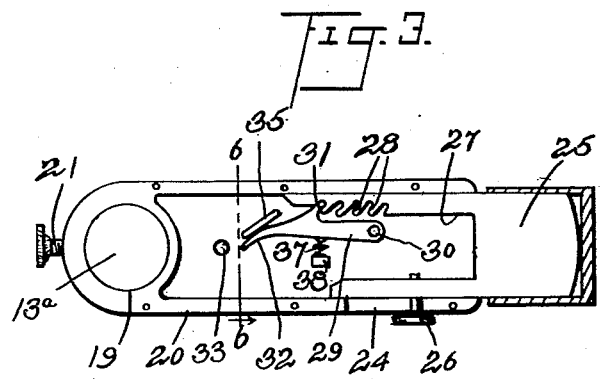
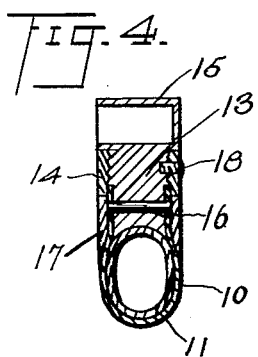
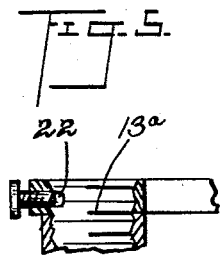
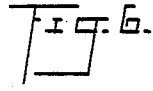
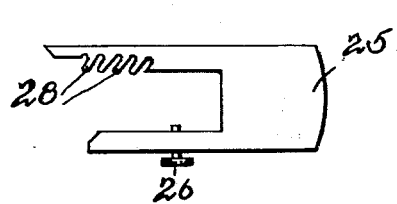
Inventor
J. E. Craver.

UNITED STATES PATENT OFFICE.

JOHN E. CRAVER, OF STOCKTON, CALIFORNIA.

WHEEL-LOCK.

1,114,585.  Specification of Letters Patent.  Patented Oct. 20, 1914.

Application filed May 28, 1914. Serial No. 841,507.

*To all whom it may concern:*

Be it known that I, JOHN E. CRAVER, a citizen of the United States, residing at Stockton, in the county of San Joaquin and State of California, have invented certain new and useful Improvements in Wheel-Locks, of which the following is a specification.

This invention relates to locks and more particularly to a lock specially designed for attachment to the frame of a motorcycle, bicycle or similar vehicle to lock the wheel against rotation.

An object of the invention is the provision of a lock of this character of novel and efficient construction and means for rotatably securing the lock to the frame of the vehicle whereby, when desired, the lock may be swung to inoperative position.

Another object is the provision of means for reliably securing the lock in inoperative position.

Another object is the provision of a bicycle and motorcycle lock of simple and inexpensive construction which may be quickly and reliably secured in operative position on practically any type of bicycle or motorcycle.

With these and other objects in view, the invention consists in the novel construction, arrangement and combination of parts as will be hereinafter specifically described, claimed and illustrated in the accompanying drawings, in which, Figure 1 represents a front elevation of the lock applied to use, Fig. 2 represents a view similar to Fig. 1, showing the lock in inoperative position, Fig. 3 represents a front elevation of the lock with the front plate removed, and showing the keeper in section, Fig. 4 represents a transverse sectional view on the line 4—4 of Fig. 2, Fig. 5 represents a fragmental sectional view on the line 5—5 of Fig. 2, Fig. 6 represents a transverse sectional view through the lock on the line 6—6 of Fig. 3, and, Fig. 7 represents a plan view of the bolt removed from the lock.

Referring to the drawing in detail, wherein similar reference numerals designate corresponding parts throughout the several views, the numeral 10 indicates a strap substantially U-shaped in formation and engaged over one of the front or rear forks 11 of a bicycle or motorcycle inwardly of the rim 12 of the front or rear wheel of the latter. The free ends of the U-shaped strap 10 are engaged against the diametrically opposed flat faces of a bolt 13 having one end concaved to snugly fit against the forked bar 11 and having screw threads on the opposite end receiving the interiorally threaded sleeve 14 of the keeper 15. A pin 16 is positioned through the free end of the strap 10 and the bolt 13 for locking the strap and bolt together, and the sleeve 14 serves to hold an annular member 17 over the overlapped portions of the strap 10 to conceal the extremities of the pin 16. The sleeve 14 is formed with a transversely extending threaded opening adapted to register with a threaded opening in the adjacent portion of the bolt 13 to receive a set screw 18 for locking the keeper in position on said bolt.

A second bolt 13ª is secured to the other fork 11 of the pair by a strap 10 and directly opposite the bolt 13 carrying the keeper 15. The bolt 13ª is received within an opening 19 formed in one end of the lock casing or housing 20 in which is fitted a set screw 21 adapted to seat within an opening 22 formed in the upper portion of the bolt 13ª to lock the rotatable casing 20 in inoperative position, as illustrated in Fig. 2. The front of the casing 20 is closed by a cover or top plate 23 and a slot 24 is formed through one of the side walls of said casing. A bolt 25 is slidably mounted within the open end of the casing 20 and is provided with a headed pin or handle 26 projecting through the slot 24 for operating the bolt 25. The inner end of the bolt 25 is recessed or cut away, as indicated at 27, to provide a pair of parallel extensions or arms having sliding engagement with the side walls of the casing 20. The under face of the upper arm 27 is provided with a series of teeth 28 directed downwardly and inwardly toward the bolt 13ª.

An arm 29 is pivotally mounted in the casing 20 on a pin 30 and is provided with an upwardly directed tooth 31 adapted to seat between the teeth 28 to lock the bolt 25 against inward movement, and the free end of the arm 29 is tapered, as indicated at 32, and extended into proximity with a pin 33 fixed in the casing 20 and adapted to be received within a suitable opening formed in the end of a key adapted to be positioned through a suitable key hole 34 formed in the top plate 23. A plate 35 is fixed in the casing 20 in front of the tapered end 32 of the arm 29 and is provided with slits 36 through which the teeth of the bit of a key pass when the latter is rotated on the pin 33. The tooth 31 of the arm 29 is normally retained in engagement with the teeth 28 by the tension of a spring 37 engaged at one end against the under face of said arm and seated at its opposite end against a suitable abutment 38 carried by the casing 20.

In use, the wheel of the vehicle is locked against rotation by swinging the casing 20 on the bolt 13ª into the position illustrated in Fig. 1, and subsequently moving the bolt 25 into the keeper 15 by the handle 26. Inward movement of the bolt is prevented by the tooth 31 engaging and locking with the teeth 28. As the lock is positioned between the spokes 40 of the wheel it is obviously impossible to rotate the latter. When it is desired to release the wheel, the key (not shown) is inserted within the lock 34 and rotated to swing the pivoted arm 29 downwardly by the engagement of the teeth or bit of the key against the tapered end 32 of said arm. The tooth 31 is withdrawn from the teeth 28 and the bolt 25 withdrawn from the keeper 15 by the handle 26. The lock is swung downwardly on the bolt 13ª into the vertical position illustrated in Fig. 2, and the set screw 21 is subsequently seated within the seat or recess 22 in the bolt 13ª, thus effectively securing the lock in inoperative position.

What I claim is:—

1. In combination, a pair of forks, a wheel rotatably mounted between said forks, a U-shaped member receiving one of said forks, a bolt having threads on one end and having the opposite end concaved and engaged against said fork between the free ends of said U-shaped member, a pin positioned through the ends of said U-shaped member and through said bolt, an annular member positioned over said bolt and the free ends of said U-shaped member, a keeper, a threaded sleeve on said keeper receiving the threaded end of said bolt, means for securing said keeper against rotation on said bolt, and a lock rotatably secured to the other fork including a bolt adapted to be seated within said keeper to prevent the rotation of said wheel.

2. In combination, a pair of forks, a wheel rotatably mounted between said forks, a U-shaped strap secured to one of said forks, a bolt secured between the free ends of said U-shaped strap, a lock rotatably mounted on said bolt, means for securing said lock against rotation on said bolt, a keeper secured to the other fork, and a slidable bolt in said lock adapted to be seated within said keeper when said lock is moved into position between the spokes of said wheel.

3. A lock comprising a casing having an open end and a slot in one side wall adjacent said open end, a bolt slidable in said open end and having its inner end recessed to provide a pair of parallel extensions, a handle carried by one of said extensions projecting through said slot, teeth on the under face of the upper extension, and a key controlled member in said casing coöperating with said teeth to prevent inward movement of said bolt.

In testimony whereof I affix my signature in presence of two witnesses.

JOHN E. CRAVER.

Witnesses:
A. E. FRAZIER,
GEO. R. SCANTLEBURY.